Aug. 12, 1941.  V. H. VAN SANT  2,252,145
BOLT AND NUT LOCK
Filed Sept. 23, 1939
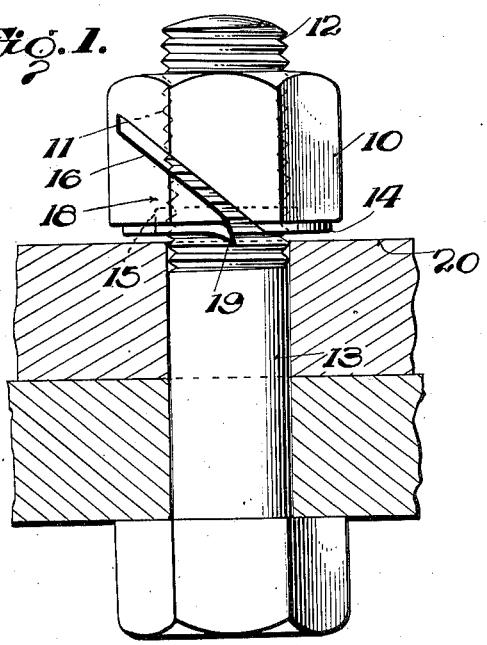
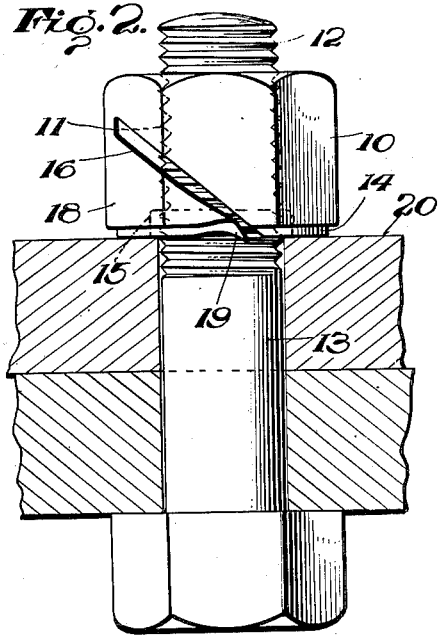
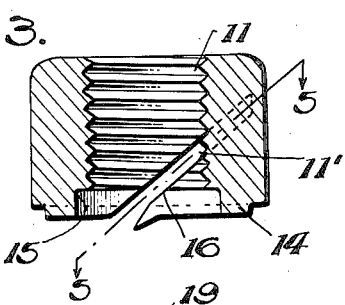
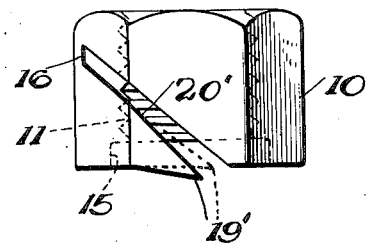
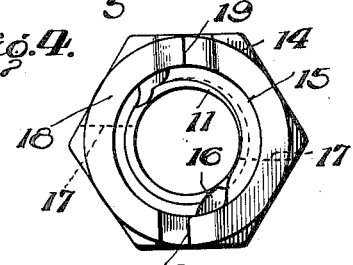
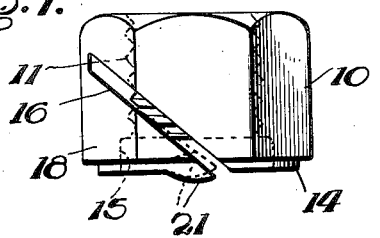
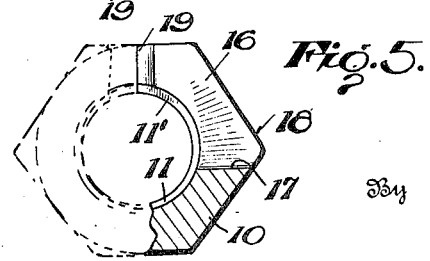
Inventor
Victor H. Van Sant.
By
Attorney Patented Aug. 12, 1941

2,252,145

UNITED STATES PATENT OFFICE 2,252,145

BOLT AND NUT LOCK

Victor H. Van Sant, Westfield, N. J., assignor of one-third to Wilbur B. Driver, Newark, N. J., and one-third to Henry Kershaw, Belleville, N. J.

Application September 23, 1939, Serial No. 296,313

2 Claims. (Cl. 151—21)

My invention relates to bolt and nut locks.

An important object of the invention is to provide means for yieldingly pressing the threads of the nut against the threads of the bolt to prevent improper rotation of the nut.

A further object of the invention is to provide means of the above mentioned character which is also adapted to bite into the work or the like to prevent accidental rotation of the nut.

A further object of the invention is to provide a nut and lock means which produces a unitary construction.

A further object of the invention is to provide a device of the above mentioned character which is of simple construction and may be manufactured cheaply for commercial use.

Other objects and advantages of the invention will be apparent during the course of the following description.

In the accompanying drawing forming a part of this application and in which like numerals are employed to designate like parts throughout the same, Figure 1 is a side elevation of a bolt and nut lock embodying my invention, with the nut spaced from the surface, Figure 2 is a similar view, with the nut screwed up tight to contact with the surface, Figure 3 is a central vertical section through the nut, Figure 4 is an elevation of the inner end of the nut, Figure 5 is a section taken on line 5—5 of Figure 3, Figure 6 is a side elevation of a nut embodying a modification of the invention, and, Figure 7 is a similar view of a nut embodying a further modification of the invention.

In the drawing, wherein for the purpose of illustration are shown preferred embodiments of my invention, the numeral 10 designates a nut having a bore provided with screw-threads 11. This bore receives the screw-threaded end 12 of a bolt 13. Upon its inner end, the nut 10 has an annular flange 14. At its inner end, this nut is counter-bored, providing a cylindrical recess 15, extending through the flange 14. The recess 15 is free from screw-threads, and is slightly larger in diameter than the screw-threaded end 12 of the bolt and the wall of the recess 15 will not contact therewith.

The nut 10 is provided in its periphery with one or more slots 16, cut therein. For the purpose of illustration, I have shown two of these slots, while the number may be varied, as found advantageous. Each slot extends preferably for approximately 90°. The slot is inclined or oblique and extends upwardly toward its leading end 17. The trailing end of the slot is open, as shown. The slot extends through the lower portion of the screw-threads 11 of the nut 10. This slot 16 forms a finger or pawl 18. The free end of this finger or pawl is bent downwardly or outwardly, producing a blade-like jaw 19, normally arranged in a plane outwardly of the inner end of the nut and the outer face of the flange 14. In this form of the invention, the side walls of the slot 16 are parallel throughout the major portion of their length and the free end of the finger or pawl 18 is bent outwardly or downwardly sharply to produce the blade-like edge 19.

The slots 16 are first cut forming the fingers or pawls 18 which are bent to produce the outwardly projecting jaws 19, after which the screw-threads 11 are tapped or cut, portions 11' of these screw-threads being formed upon the fingers or pawls 18, as shown.

After the several parts of the nut have thus been formed, the nut is hardened and spring-tempered to render the finger or pawl 18 resilient. The nut may be made of any suitable material, such as steel, a steel alloy or the like.

In the use of this form of the invention, the nut 10 is placed upon the bolt and is screwed up in the usual manner until the edge 19 engages the surface 20 to which the bolt is applied. Upon further screwing-up movement of the nut, the finger or pawl 18 is bent or flexed into the slot 16. This bending or flexing of the resilient finger or pawl can occur by virtue of the fact that the recess 15 has no screw-threads and is spaced from the screw-threaded portion of the bolt, and since the outer portion of the finger or pawl 18 includes the wall of the recess 15, the outer end portion of the finger or pawl has no contact with nor screw-threaded engagement with the screw-threaded portion of the bolt. The outer portion of the finger or pawl 18 is thus spaced out of contact with the screw-threaded portion of the bolt, which is effected by means of the recess 15, but this may be accomplished by other means. When the nut is screwed up completely so that the outer face of the flange 14 contacts with the surface 20, the finger or pawl 18 is placed under the maximum compression. This finger or pawl 18 will transmit a constant yielding pressure to the portions 11' of the screw-threads formed upon said finger or pawl 18, and the screw-threads of the nut will thus have binding engagement with the screw-threads of the bolt, preventing accidental unscrewing of the bolt. Further, the edge 19 of the finger or pawl 18 bites into the surface 20 and this edge not only serves to place the finger or pawl 18 under compression, but to hold the nut against rotation at the surface 20.

In Figure 6, I have shown a slight modification of the invention. In this figure, the resilient finger or pawl 18 is bent outwardly starting at about a point 20', to the blade-like edge 19'. The edge 19' will serve to place the resilient finger or pawl 18 under compression when the nut is screwed up, but the edge 19' will not tend to bite into the surface 20, as is the case in connection with the first form of the invention. All other parts of the bolt and nut remain identical with those shown and described in connection with the first form of the invention.

In Figure 7, I have shown a further modification of the invention. In this figure, the resilient finger or pawl 18 does not have its free end bent outwardly or downwardly, and the opposite walls of the slot 16 are normally parallel throughout their entire length. At the free end of the finger or pawl 18, I provide a raised portion or lug 21, projecting outwardly beyond the face of the flange 14. All other parts of the nut and bolt remain identical with those shown and described in connection with the first form of the invention.

When the nut 10 shown in Figure 7 is applied to the bolt and screwed up, the raised portion or lug 21 will engage with the surface 20, and the free end portion of the resilient finger 18 will be bent into the slot 16 and placed under compression. This will cause a binding action between the screw-thread portions 11' formed upon the finger or pawl 18 and the screw-threads of the bolt. This will prevent accidental unscrewing of the nut.

It is to be understood that the forms of my invention herewith shown and described are to be taken as preferred examples of the same and that various changes in the shape, size, and arrangement of parts may be resorted to without departing from the spirit of my invention or the scope of the subjoined claims.

Having thus described my invention, what I claim is:

1. In a bolt and nut lock, a bolt having a screw-threaded portion, a nut having a bore provided with screw-threads to receive the screw-threaded portion of the bolt, said nut being provided at its inner end with a recess having a greater diameter than the diameter of the screw-threaded bore of the nut, said nut being provided in its periphery with an inclined slot extending through the screw-threads of said bore and the wall of said recess for forming a finger, said slot also passing through the inner end of the nut, said finger being resilient and having a part near its free end projecting outwardly beyond the inner end of the nut, the inner portion of the finger having portions of the screw-threads of the nut formed thereon while the outer portion of the finger includes the wall of the recess and is free from screw-threads and unlocked from the screw-threads of the bolt.

2. A bolt and nut lock, comprising a bolt having a screw-threaded portion, a nut having a bore provided with screw threads to receive the screw-threaded portion of the bolt, said nut being provided in its periphery with a slot which extends generally longitudinally of the turning axis of the nut, said slot being inclined with respect to the turning axis of the nut and extending transversely of and through the screw threads of the bore, said slot extending through the inner end of the nut, said slot forming a finger, said finger being yieldable and having a part near its free end projecting outwardly beyond the inner end of the nut, the inner portion of the finger having portions of the screw threads of the nut formed thereon, the outer portion of the finger being free from screw-threaded engagement with the screw-threaded portion of the bolt and yieldable with relation to the bolt, the finger tending to tilt due to its yielding action and thereby effecting a binding action between the screw threads upon the inner portion of the finger and the screw threads upon the bolt.

VICTOR H. VAN SANT.